May 15, 1956     T. BRENDEL     2,745,315
HIGH SPEED CORRECTED OBJECTIVE COMPRISING
FOUR AIR SPACED MEMBERS
Filed July 19, 1951

INVENTOR:
THEODOR BRENDEL
BY
HIS ATTORNEYS

United States Patent Office

2,745,315
Patented May 15, 1956

2,745,315

HIGH SPEED CORRECTED OBJECTIVE COMPRISING FOUR AIR SPACED MEMBERS

Theodor Brendel, Munich, Germany, assignor to Agfa Camera-Werk Aktiengesellschaft, Munich, Germany, a corporation of Germany Application July 19, 1951, Serial No. 237,566

Claims priority, application Germany July 26, 1950

2 Claims. (Cl. 88—57)

My present invention relates to a photographic objective corrected for spherical and chromatic aberrations, coma, astigmatism, field-curvature and distortion, having disturbed symmetry in construction and very high aperture. More particularly the present invention is concerned with a lens combination for photographic purposes, comprising four members, composed of optical glasses and separated from each other by air spaces, of which the two outer members are convergent single elements, whereas the two inner members represent cemented menisci of negative power, that turn their concave surfaces towards the aperture stop. More specifically the invention is concerned with objectives of the type described, which have an overall length ranging between 0.55 times and 0.67 times the total focal length of the objective and an axial air space between the two cemented menisci being greater than 0.2 times and less than 0.25 times the said focal length.

An overall length being not greater than 0.67 times the total focal length makes it possible to mount such an objective in a central shutter of the size (e. g. Compur 00) usually employed in a miniature camera without substantially increasing the diameters for the front and back member of the objective in order to reduce vignetting.

An axial air space between the two cemented menisci being more than 0.2 times the total focal length is a substantial supposition for minimizing chromatic aberrations. With such lens combinations that may be considered derivatives of Gauss' double-objective it is possible, as already known, also with a very high aperture and large image field to achieve in a high degree an elimination of optical defects. This was hitherto accomplished for example by employing in at least one of the two cemented menisci lens forms whose accurate production involved great difficulties.

According to the present invention it is found that by employing customary optical glasses, the same result will be attained, when lens shapes are used, that may be manufactured in a simple manner, i. e. by forming both cemented surfaces of said menisci as plane surfaces. This simplification of manufacturing and a simultaneous improvement of the corrections are possible, if, the overall length is not greater than ⅔ of the total focal length of the objective, the axial air space between the two cemented menisci is not less than ⅕ of the total focal length, with a minimum aperture of F:2.8, wherein both for the part of the lens combination that lies in front of, as well as that which lies behind the aperture stop, the refractive indices for the $d$-line of the spectrum of the convergent single element ($n_1$, $n_6$) and of the divergent part of the cemented meniscus ($n_3$, $n_4$) ranges between 1.62 and 1.72, their difference ($n_1-n_3$ or $n_4-n_6$) however being between −0.01 and +0.01 and simultaneously the refractive index of the convergent part ($n_2$, $n_5$) of the cemented meniscus is at least 0.04 but not more than 0.1 greater than that of the divergent part ($n_3$, $n_4$) as well as of the convergent single element ($n_1$, $n_6$).

The above mentioned condition may be expressed by the following formulas:

$$1.62 \leq \left\{ \begin{matrix} n_1, & n_6 \\ n_3, & n_4 \end{matrix} \right\} \leq 1.72$$

$$-0.01 \leq \left\{ \begin{matrix} n_1-n_3 \\ n_4-n_6 \end{matrix} \right\} \leq +0.01$$

$$0.04 \leq \left\{ \begin{matrix} n_2-n_3 \\ n_5-n_4 \end{matrix} \right\} \leq 0.10$$

A particularly advantageous arrangement results, if the convergent single element, furthermore, the convergent parts and, finally the divergent parts of the compound members, are in each case made of the same glass ($n_1=n_6$, $n_2=n_5$, $n_3=n_4$).

The lens combination constructed in the manner described above possesses a correction condition that is not only equal to that of the known pointed lens combination, but actually exceeds it. Through the introduction of the plane cemented surfaces in the two compound members, the maintenance of the necessary tolerances for such a high grade lens combination, above all with respect to the lens thicknesses, is made substantially easier in the serial production.

It is easily to be understood, that minor deviations from the plane form of the cemented surfaces do not noticeably influence the correction of the lens combination.

The accompanying drawing illustrates diagrammatically an objective according to the invention. In this drawing.

Figure 1:
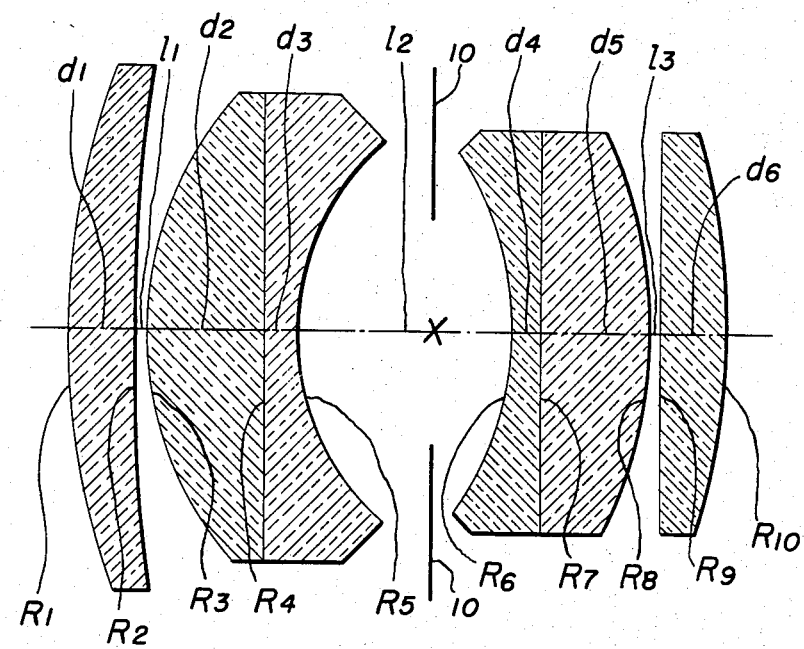
Fig. 1 shows an axial section of the objective.
Figures 2, 3, 4:
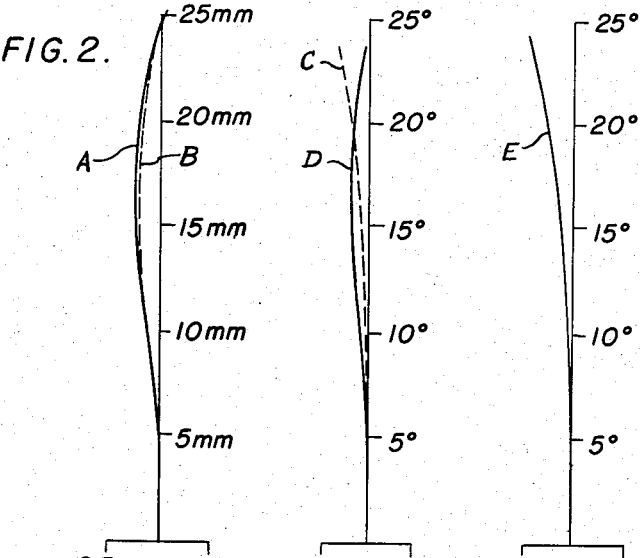
Fig. 2 shows the curve (A) in solid line for spherical aberration and the curve (B) in broken line for sine condition. Both curves refer to the D-line of the spectrum.
Fig. 3 shows the astigmatic curves (the meridional curve (C) in broken line and the saggital curve (D) in solid line).
Fig. 4 shows the distortion curve (E).

In Fig. 1 the aperture stop is indicated by the reference numeral 10. Numerical data for a convenient example of objective according to the invention is set out in the table below. In the drawing and also in the table the radii of curvature of the various surfaces are indicated by R1, R2 . . . , the thickness of the individual elements along the axis by $d_1$, $d_2$ . . . , and the air spaces along the optical axis by $l_1$, $l_2$ . . . , in each case counting from the front of the lens. The table also gives the refractive indices for the $d$-line of the spectrum and the Abbé-numbers V of the materials of which the lens elements are made.

The example shown in Fig. 1 has an equivalent focal length f=100 mm. and a relative aperture F:2.

*Example 1*

| Radii | Thicknesses and Air Spaces | Kinds of Glass | |
|---|---|---|---|
| | | $n_d$ | V |
| R₁ =+ 69.843 | $d_1$= 6.66 | 1.6230 | 58.1 |
| R₂ =+211.733 | $l_1$= 0.61 | | |
| R₃ =+ 33.825 | $d_2$=11.59 | 1.6667 | 48.4 |
| R₄ = ∞ | | | |
| R₅ =+ 23.563 | $d_3$= 2.89 | 1.6254 | 35.6 |
| R₆ =− 29.214 | $l_2$=20.88 | | |
| R₇ = ∞ | $d_4$= 2.99 | 1.6254 | 35.6 |
| R₈ =− 42.847 | $d_5$=10.82 | 1.6667 | 48.4 |
| R₉ =+620.03 | $l_3$= 0.10 | | |
| R₁₀=− 64.80 | $d_6$= 6.27 | 1.6230 | 58.1 |

Example 2

| Radii | Thicknesses and Air Spaces | Kinds of Glass | |
|---|---|---|---|
| | | $n_d$ | V |
| $R_1 = +\ 67.100$ | $d_1 = 7.0$ | 1.62280 | 56.9 |
| $R_2 = +190.000$ | $l_1 = 0.1$ | | |
| $R_3 = +\ 35.023$ | $d_2 = 11.5$ | 1.67003 | 47.2 |
| $R_4 = \infty$ | $d_3 = 1.5$ | 1.62364 | 36.7 |
| $R_5 = +\ 24.400$ | $l_2 = 23.0$ | | |
| $R_6 = -\ 28.941$ | $d_4 = 2.0$ | 1.62237 | 36.1 |
| $R_7 = \infty$ | $d_5 = 12.0$ | 1.69100 | 54.8 |
| $R_8 = -\ 39.800$ | $l_3 = 0.1$ | | |
| $R_9 = +1800.0$ | $d_6 = 6.8$ | 1.62280 | 56.9 |
| $R_{10} = -\ 71.272$ | | | |

Example 3

| Radii | Thicknesses and Air Spaces | Kinds of Glass | |
|---|---|---|---|
| | | $n_d$ | V |
| $R_1 = +\ 62.216$ | $d_1 = 6.804$ | 1.62320 | 56.7 |
| $R_2 = +190.386$ | $l_1 = 0.104$ | | |
| $R_3 = +\ 36.974$ | $d_2 = 11.500$ | 1.67077 | 47.3 |
| $R_4 = \infty$ | $d_3 = 2.505$ | 1.62560 | 35.6 |
| $R_5 = +\ 24.837$ | $l_2 = 21.498$ | | |
| $R_6 = -\ 31.808$ | $d_4 = 5.990$ | 1.64781 | 33.8 |
| $R_7 = \infty$ | $d_5 = 9.997$ | 1.71785 | 47.9 |
| $R_8 = -\ 44.982$ | $l_3 = 0.104$ | | |
| $R_9 = +536.867$ | $d_6 = 6.491$ | 1.64251 | 58.3 |
| $R_{10} = -\ 80.886$ | | | |

I claim:
1. A high speed photographic objective having a minimum aperture of F:2.8 corrected for spherical and chromatic aberrations, astigmatism, coma, field curvature and distortion, comprising four members separated from each other by air spaces of which the two outer members are convergent single elements whereas the two inner members are convergent single elements whereas the two inner members represent cemented menisci of negative power having their concave surface facing towards the central stop, the overall length ranging between 0.55 times and 0.67 times the total focal length of the objective, the axial air space between the two cemented menisci being greater than 0.2 times and less than 0.25 times said focal length, wherein both cemented surfaces are plane and for both the part in front of as well as that behind the central stop the refractive indices for the $d$-line of the spectrum (587.6 mu) of the convergent single element and of the divergent part of the cemented meniscus ranges between 1.62 and 1.72, their difference however being between −0.01 and +0.01 and simultaneously the refractive index of the convergent part of the cemented meniscus is at least 0.04 but not more than 0.1 greater than that of the divergent part as well as of the convergent single element.

2. A photographic lens as claimed in claim 1, wherein the convergent single elements, the convergent and divergent parts of the cemented members in each case are made of the same glass.

References Cited in the file of this patent
UNITED STATES PATENTS

| | | | |
|---|---|---|---|
| 1,786,916 | Merte | | Dec. 30, 1930 |
| 1,955,591 | Lee | | Apr. 17, 1934 |
| 2,117,252 | Lee | | May 10, 1938 |
| 2,130,760 | Warmisham | | Sept. 20, 1938 |
| 2,349,893 | Warmisham et al. | | May 30, 1944 |
| 2,532,751 | Baker | | Dec. 5, 1950 |

FOREIGN PATENTS

| | | | |
|---|---|---|---|
| 157,040 | Great Britain | | Jan. 20, 1921 |